T. T. ABBOT.
Car Wheel.
No. 7,896.
Patented Jan. 14, 1851.
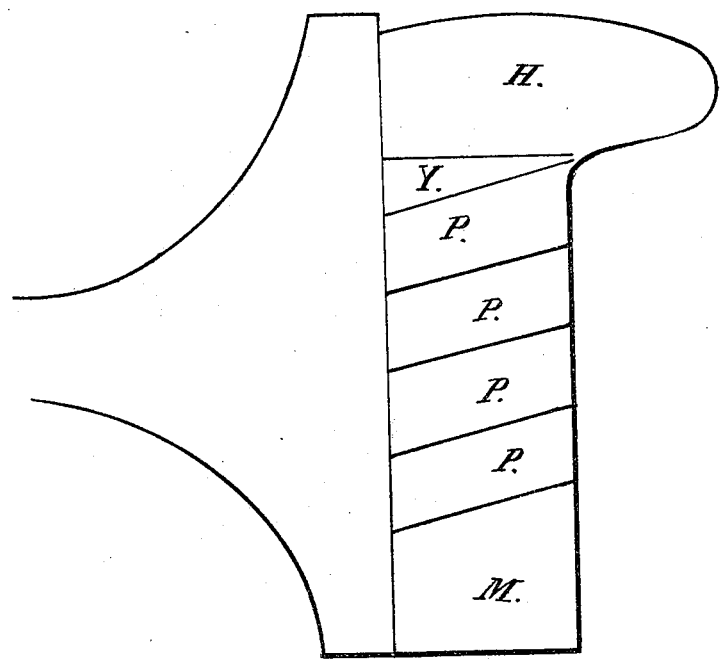

UNITED STATES PATENT OFFICE.

THEODORE T. ABBOT, OF MANCHESTER, NEW HAMPSHIRE.

TIRE FOR RAILROAD-CAR WHEELS.

Specification of Letters Patent No. 7,896, dated January 14, 1851.

*To all whom it may concern:*

Be it known that I, THEODORE T. ABBOT, of Manchester, in the county of Hillsborough and State of New Hampshire, have invented a new and useful Improvement in the Construction of Tires for Car-Wheels, of which the following is a full and exact description.

A ring or hoop H is first made of iron or steel, about $1\frac{1}{4}$ inch thick and $2\frac{3}{4}$ inches wide, of suitable diameter, according to the size of the wheel. This hoop is to be shrunk upon the inner edge of the rim of the wheel. The thickness and width of this hoop may be varied if necessary. Next make another ring or hoop T, about $\frac{3}{4}$ of an inch thick, and as wide as the tread of the tire is intended to be thick. Bevel the outer edge of this hoop and shrink it on the rim beside the hoop H, with the bevel side out. The object of this hoop is to match the concave or disked shape of the remaining hoops, it may therefore be dispensed with, by making the first hoop H, thicker, and beveling the inside. Next several hoops or rings P, P, P, P, are to be made of iron or steel, the latter is preferable, as wide as the tread of the tire is to be thick, and as thin as they can conveniently be welded, say half an inch. The sides of these hoops to be made dishing to match each other and the ring T. Shrink as many of these hoops on the rim, as are necessary to give the desired width of tread. Next shrink upon the rim and hoop M, considerably thicker than those last set, having the inner side dished to match them. Press them firmly together while hot so that their contiguous sides shall bear firmly against each other.

The advantages of this improvement are first, greater security to the wheel. Should one the hoops break enough will remain to prevent accident. The shape and position of the pieces, which form the tread are the best possible to sustain the pressure. The tires in common use are liable to expand by the pressure, become loose and draw off. This cannot happen to this kind of tire for the pieces which form the tread being distinct from those on the outside if it were possible to expand them in this way, still the latter would remain unaffected. It is also the cheapest and most convenient method of substituting steel for iron.

What I claim therefore as my invention and for which I wish to obtain Letters Patent, is—

Making the tire of car wheels by the combination of several distinct pieces so arranged and disposed as mutually to support and confine each other, substantially in the manner above described.

T. T. ABBOT. [L. S.]

In the presence of—
DAVID CROSS,
C. R. MERRILL.